United States Patent [19]
Richman et al.

[11] Patent Number: 4,958,595
[45] Date of Patent: Sep. 25, 1990

[54] DISPOSABLE BIRD FEEDER

[75] Inventors: Elaine A. Richman, 6102 Ivydene Ter., Baltimore, Md. 21209; Darrell D. Fish, Baltimore, Md.

[73] Assignee: Elaine A. Richman, Baltimore, Md.

[21] Appl. No.: 431,085

[22] Filed: Nov. 3, 1989

[51] Int. Cl.⁵ ............................................. A01K 39/01
[52] U.S. Cl. ................................... 119/52.2; 119/57.8
[58] Field of Search .................. 119/52.1, 52.2, 51.01, 119/57.8

[56] References Cited

U.S. PATENT DOCUMENTS 2,731,950  1/1956  Davidson ........................... 119/52.1
3,115,865  12/1963  Parkes et al. ....................... 119/52.2

FOREIGN PATENT DOCUMENTS 3149939  6/1983  Fed. Rep. of Germany ..... 119/52.2

Primary Examiner—John Weiss
Assistant Examiner—R. Thomas Price
Attorney, Agent, or Firm—Leonard Bloom

[57] ABSTRACT

A disposable bird feeder is disclosed. The feeder includes a tray that has a pair of side walls. Each of the side walls includes a lower portion that is joined to the tray and an upper portion located above the tray. A general section supports the tray. The central section includes a horizontal member having opposite ends, each of which is joined to a respective side wall. The central section also includes a member for supporting the feeder. Finally, a pouch of bird feed is provided being carried by the central section and depending therefrom between the side walls and above the tray. The pouch includes manually-manipulatable device for providing a metered release of the bird feed from the pouch and onto the tray.

30 Claims, 6 Drawing Sheets

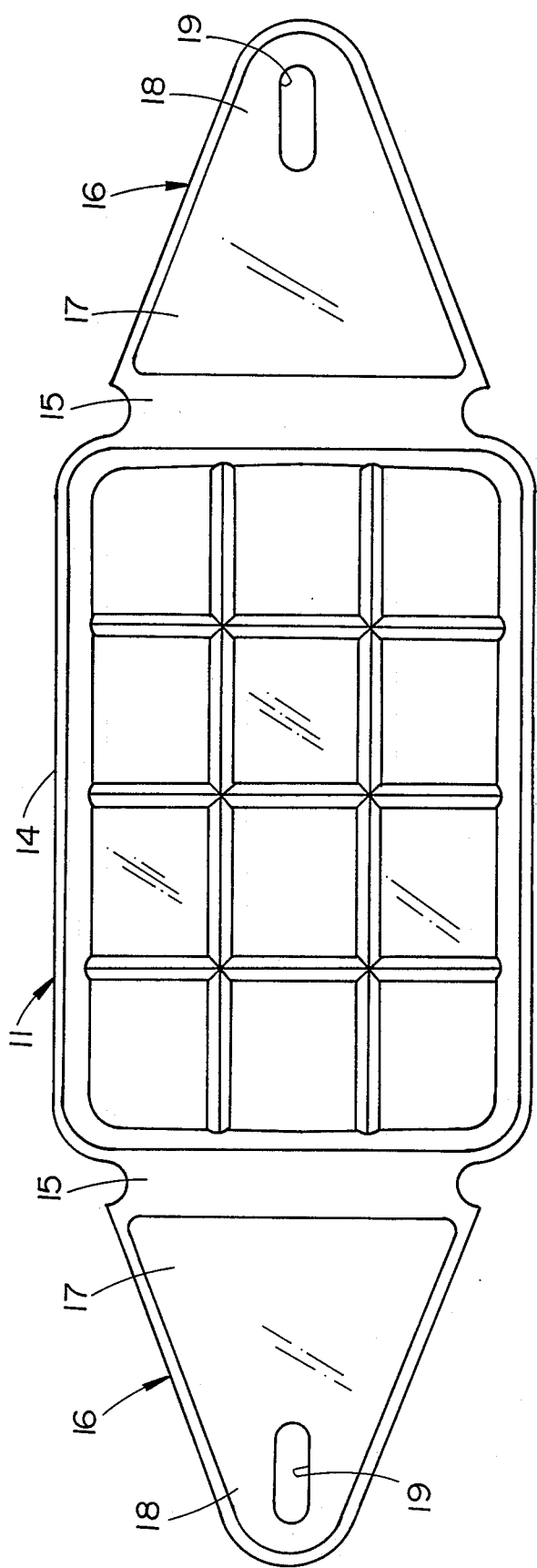
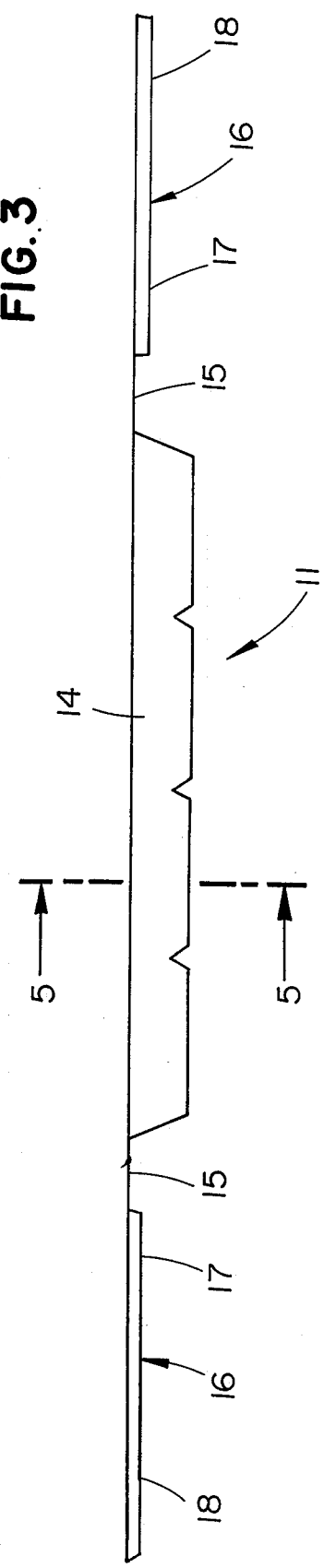
FIG. 3
FIG. 4
FIG. 5

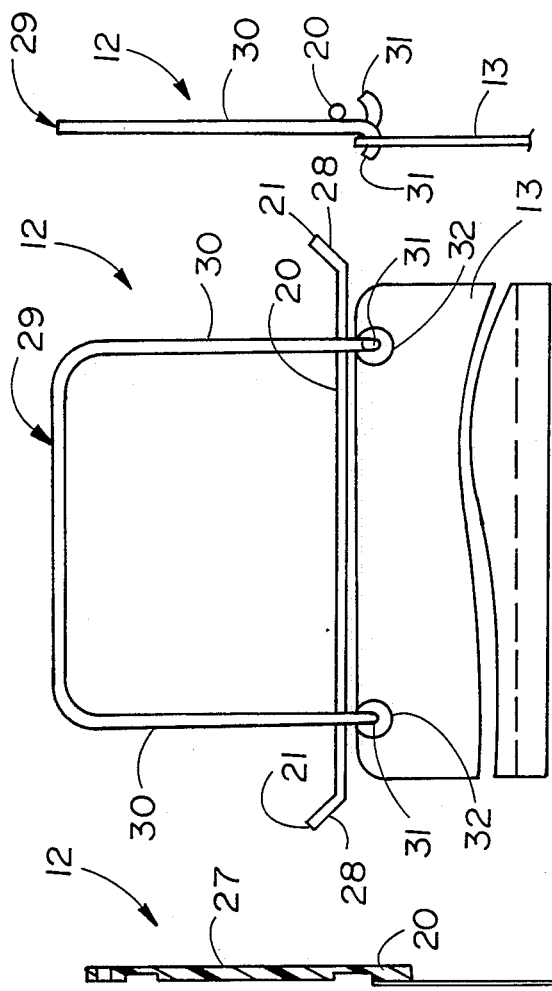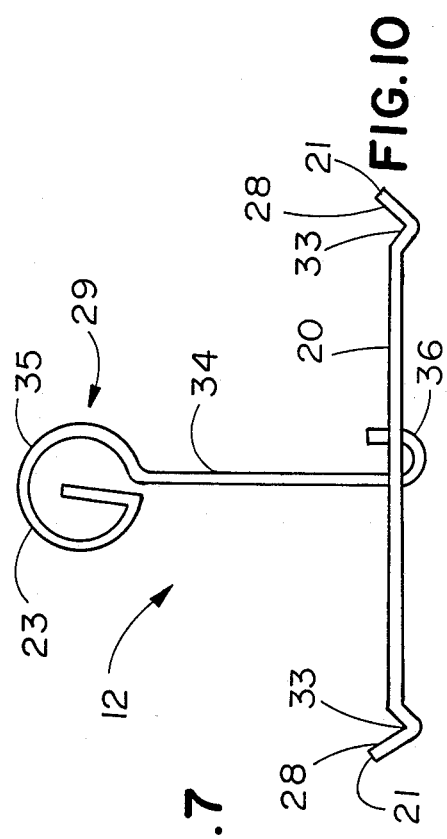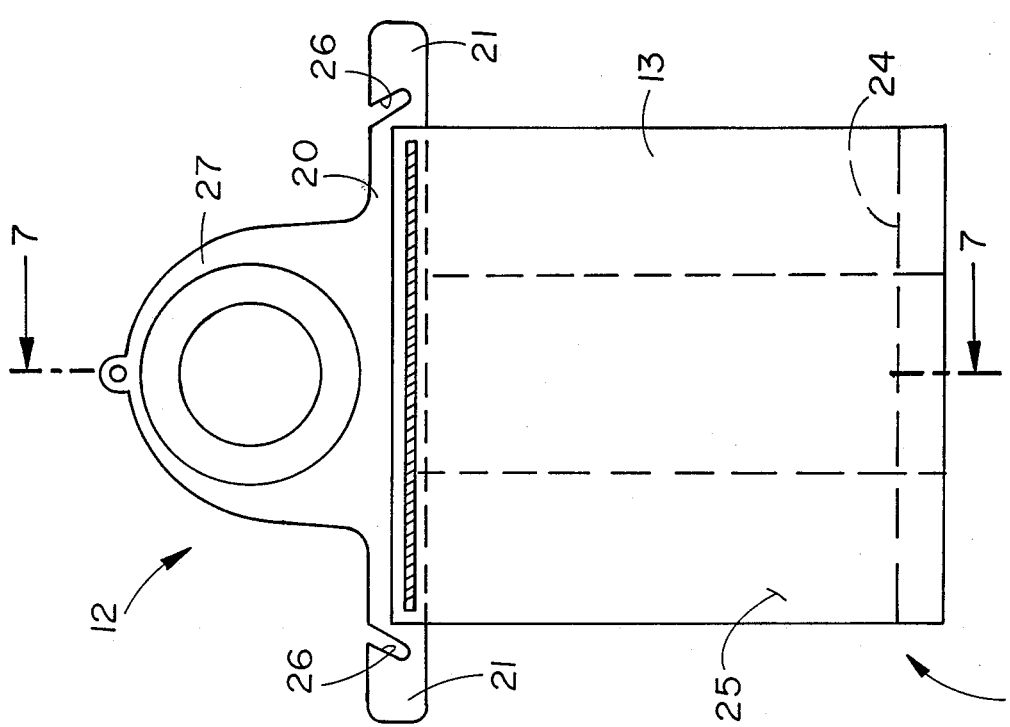

DISPOSABLE BIRD FEEDER

FIELD OF THE INVENTION

The present invention relates to bird feeders and, in particular, to disposable "throw-away" bird feeders.

BACKGROUND OF THE INVENTION

Permanent bird feeding devices having a large variety of sizes, shapes and arrangements for distributing seed have been long known in the art. Most of these arrangements, in order to be long-lasting, have resorted to the use of materials, such as wood which, while providing for prolonged use, nonetheless increases the cost of the feeder. Additionally, such feeders present problems with the storage of seed needed to continually refill these feeders and with the actual refilling process, which takes time and which can be problematic in cold and rainy weather. Examples of such feeders are disclosed in U.S. Letters Pat. Nos. 2,634,705 issued to Mayes; 3,115,865 issued to Parkes et al.; 3,198,172 issued to Crane, Jr. ; and D251,688 issued to Kimbrough II.

To alleviate problems involved with the storage of seed and with the refilling of the feeder, bird feeding devices have been disclosed that include a disposable feed "cartridge" that is used with a reusable feeder. Examples of such devices are disclosed in U.S. Letters Pat. Nos. 2,865,326 issued to Lowe, Jr.; and 3,777,711 issued to Gampp. While such devices help to alleviate the problems associated with seed storage and refilling, problems associated with cost nonetheless remain.

It has also been disclosed to provide entirely disposable bird feeders. Those such bird feeders, of which I am aware, are as follows:

| Inventor | Patent No. |
| --- | --- |
| Early | 2,775,226 |
| Early | 2,891,711 |
| Kuhn | 3,179,244 |
| Woodling | 3,354,868 |
| Lawlin et al. | 3,441,002 |
| Tucci | 3,602,196 |
| Melrath | 3,945,344 |
| Salick | 4,026,244 |
| Winston | 4,104,987 |
| Keefe | 4,223,637 |
| Olson | 4,747,370 |

In addition, I am aware of several commercially available bird feeders. One of these is a compressed mixture of seed and bird feed in the shape of a bell with a hook means extending upwardly from the apex of the bell shape. Another feeder is a cylindrical tube with a hook means extending upwardly from the top. The cylinder contains bird feed and has a plurality of openings around the circumference near the bottom edge of the cylinder. A small platform is connected to the bottom of the cylinder. Birds perch on the platform and must insert their beaks into the openings to obtain the feed; the feed does not fall from the openings.

Each of these references, while being helpful and useful for their purposes, nonetheless suffers from a particular drawback, such as a complexity, structure or design. Thus, there still remains a need for a disposable bird feeding device for distributing bird feed that is simple, easy to construct for use, inexpensive, relatively durable without the use of high cost materials and which is easily disposable after the bird seed has been consumed.

SUMMARY OF THE INVENTION

It is a primary object of the present invention to provide a new and novel disposable bird feeder for distributing feed that is simple and easy to construct for use, that is relatively durable without the use of high cost materials that can make the device expensive and which is simply and easily disposable after the seed has been consumed.

It is a further object of the present invention to provide such a disposable bird feeder that includes the feed as a pre-filled component thereof, so that the feeder may be purchased and utilized as a self-contained unit complete with bird feed.

In accordance with the teachings of the present invention, a disposable bird feeder is disclosed that includes a feed tray, a central section for support and a pre-filled pouch of bird feed. The tray includes a pair of spaced-apart upwardly-extending side walls, each of which has a lower portion that is joined to the tray and is bent upwardly therefrom. Each of the walls also has an upper section that is located above the tray. The central section includes a horizontal member that has a pair of opposite ends. Each of the opposite ends is joined to a respective upper portion of a respective side wall, such that the central section supports the tray. The central section also includes means for supporting the entire bird feeder during the use thereof. Finally, a pre-filled pouch of bird feed is provided. This pouch is carried by the central section, depending therefrom between the side walls and above the tray. The pouch includes manually-manipulatable means for providing a metered release of bird feed from the pouch and onto the tray where it may be consumed by birds.

Preferably, the opposite ends of the central section are joined to the upper portions of the side walls by a mating relationship provided by apertures formed in the side walls that receive the opposite ends. It is further preferred that the apertures be slots and that the opposite ends be hooked upwardly for engaging the slots.

In one embodiment the pouch of feed is carried by the horizontal member of the central section between the opposite ends thereof. In an alternative embodiment, the pouch of feed is carried by a pair of ears that are formed on the central section.

The central section may be fabricated from either low-cost stiff cardboard or from low-cost wire, such as bail-type wire, so that the overall cost of the feeder is kept low while necessary structural rigidity of the device is provided.

These and other objects and advantages of the present invention will become readily apparent, upon reading the following description in conjunction with the enclosed drawings.

BRIEF DESCRIPTION OF THE DRAWINGS

FIG. 3 is a top view of the tray of the present invention with the side walls bent flat with the tray for the sake of clarity.

FIG. 4 is a side view of the tray of FIG. 3.

FIG. 5 is a cross-section view taken along the lines 5—5 of FIG. 4.

FIG. 6 is a side view of one embodiment of the central section of the present invention.

FIG. 7 is a cross-section view taken along line 7—7 of FIG. 6.

FIG. 8 is a side view of another embodiment of the central section of the present invention.

FIG. 9 is a side view of the embodiment of FIG. 8.

FIG. 10 is a side view of another embodiment of the central section of the present invention.

DESCRIPTION OF THE PREFERRED EMBODIMENT

Figure 1:
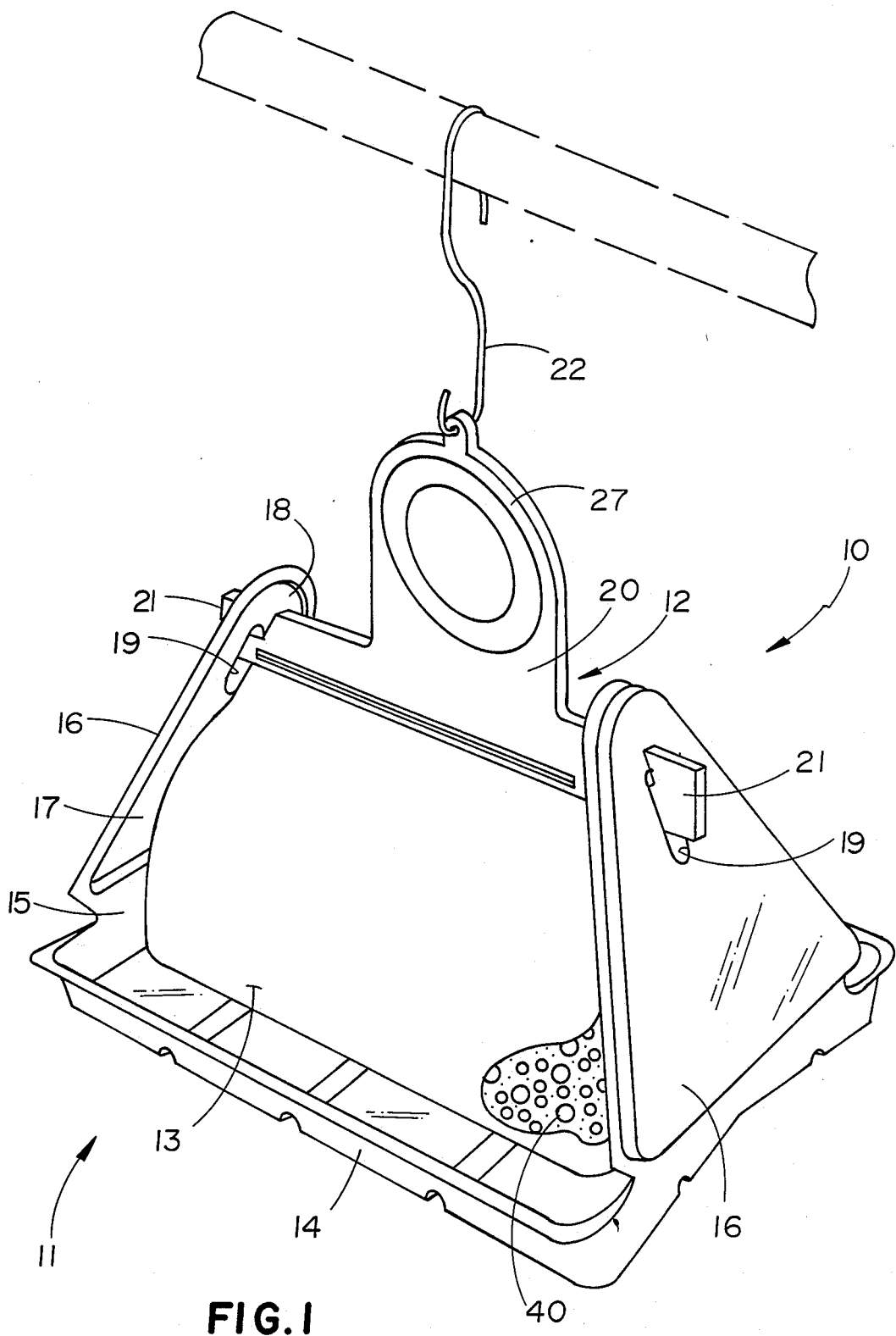
FIG. 1 is a perspective view of one embodiment of the disposable bird feeder of the present invention.

Referring now to the drawings, the disposable bird feeder 10 of the present invention includes a tray 11, a central section 12 and a prefilled pouch 13 of bird feed 40 (such as bird seed).

With particular reference now to FIGS. 1–5, the tray 11 is a molded unitary piece fabricated from a substantially rigid material, such as cardboard or, preferably, plastic. The tray 11 includes a tray plate 14, comprised of a plurality of individual sections. At opposite edges 15 of the tray plate 14 are a pair of spaced-apart upwardly-extending side walls 16, so that the tray plate 14 is located therebetween.

Figure 2:
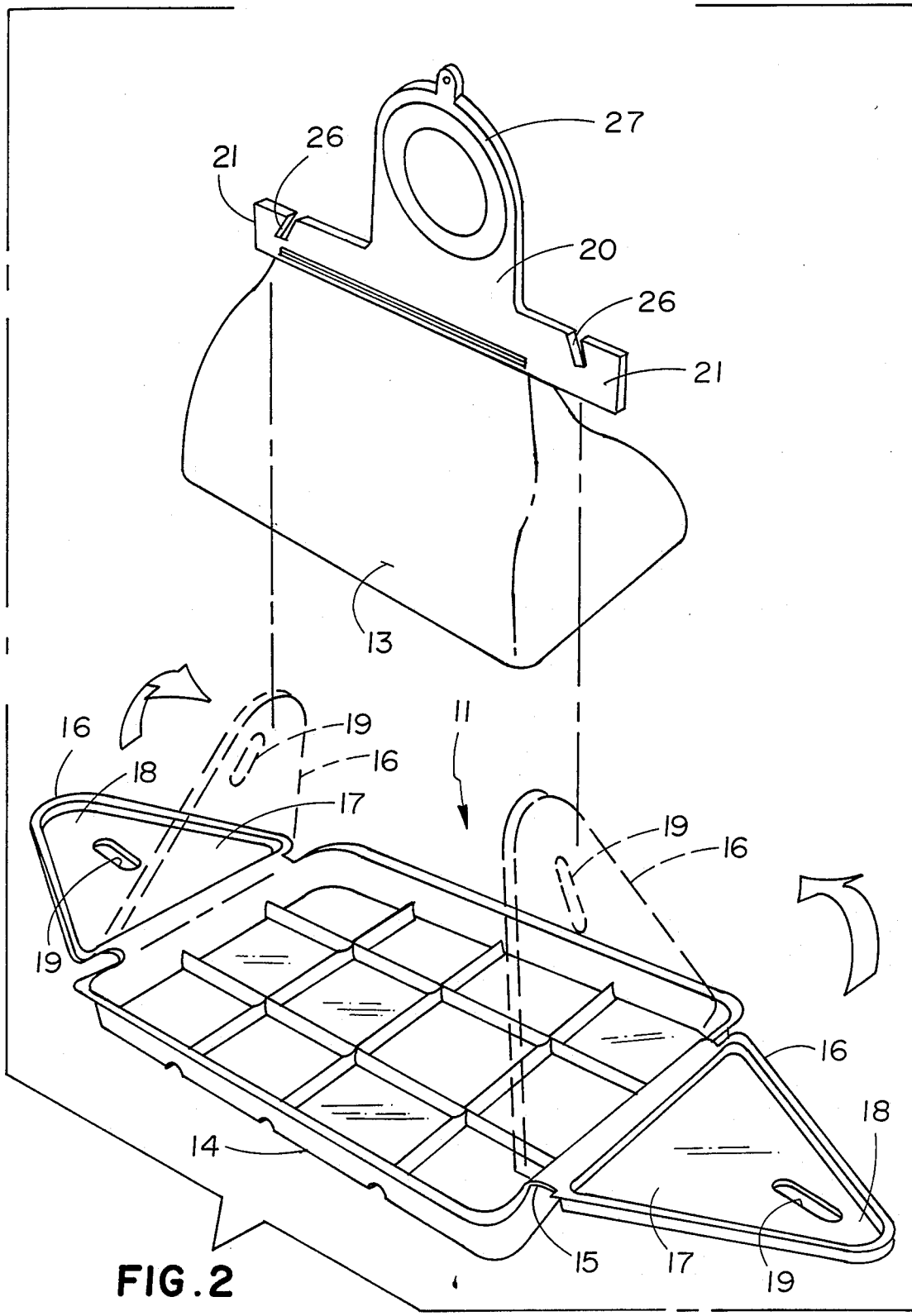
FIG. 2 is an exploded perspective view of FIG. 1 showing the folding side walls.
Figure 11:
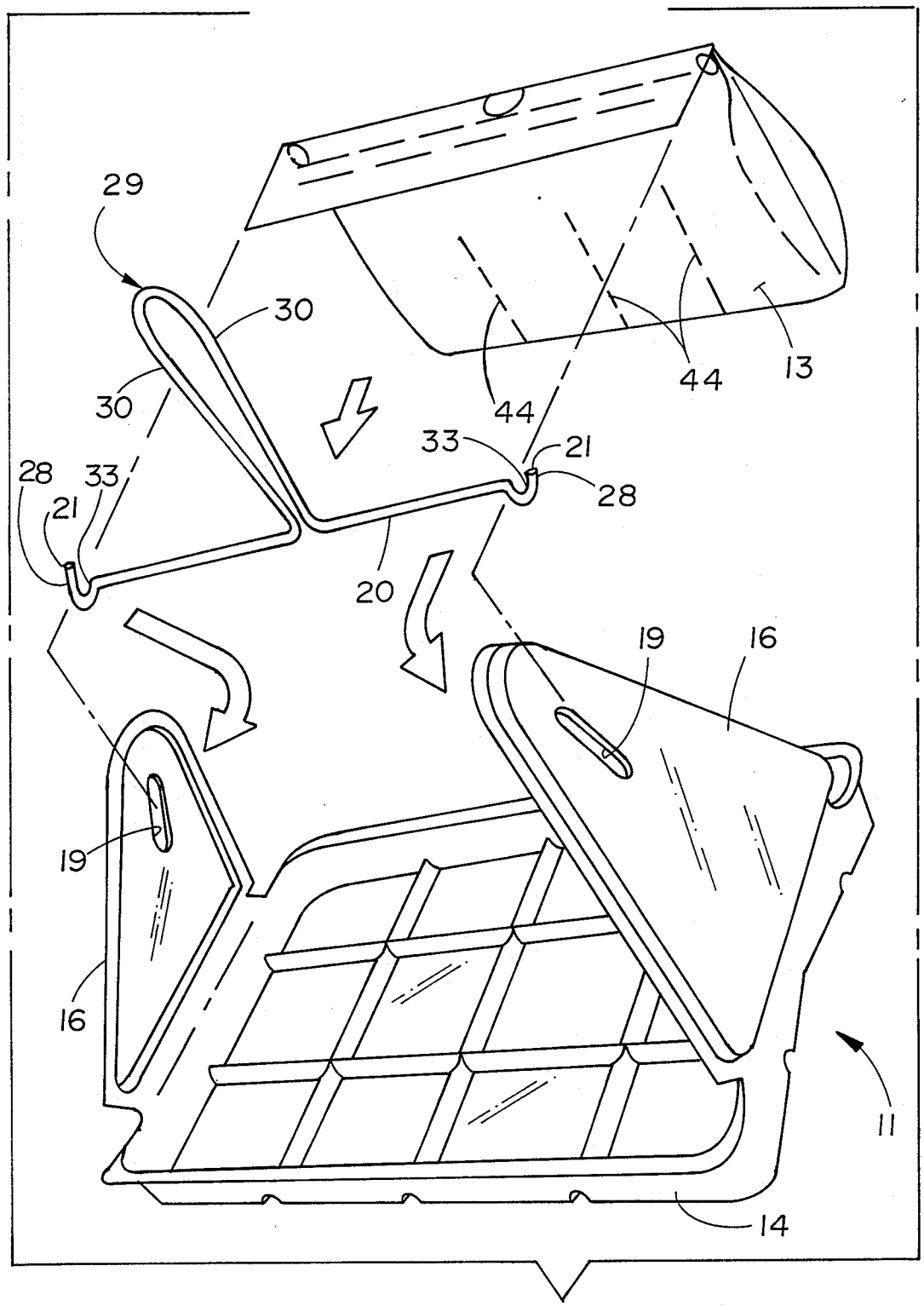
FIG. 11 is an exploded perspective view of a preferred embodiment of the present invention.

Each of the side walls 16 has a lower portion 17 and an upper portion 18. The lower portions 17 are joined to the tray plate 14 at the respective edges 15. As fabricated, the entire tray 11, including the plate 14, edges 15 and side walls 16, is flat as seen in FIGS. 2–4. To place the feeder 10 in use, one needs simply to fold or bend the side walls 16 upwardly along the edges 18.

The upper portion 18 of the side walls 16 have respective apertures 19 formed therein. Preferably, apertures 19 are in the form of slots. Formed thusly, when the side walls 16 are folded or bent upwardly, the upper portion 18 is located above the tray plate 14 with the apertures 19 substantially aligned with one another.

Referring now to FIGS. 1, 2 and 6–13, the central section 12 includes a horizontal member 20 having a pair of respective opposite ends 21. Each of the opposite ends 21 is joined to the respective upper portions 18 of the side walls 16. Preferably, the respective opposite ends 21 are in the form of hooks which are received through and engage and mate with the apertures 19, so that the central section 12 supports the tray 11. The central section 12 also includes means, such as a hook 22 (See FIG. 1) or a loop 23, (see FIGS. 8–13) for hanging the feeder 10 on a suitable support, such as a tree. It is to be understood that, while this means has been disclosed and illustrated herein as a hook 22 or loop 23, any suitable means may be provided.

Returning now to FIGS. 1, 2 and 7–13, the pouch 13 of bird feed 40 is carried and supported by the central section 12, so as to depend therefrom between the side walls 16 and above the tray plate 14. Preferably, this pouch 13 is fabricated from plastic or some other similar material. The pouch 13 includes a manually-manipulatable means, such as tear strip 24, perforated or partially perforated lines 44, which provides a controlled metered release of the bird feed from the pouch 13 and onto the tray plate 14 of the tray 11.

It is preferred that the pouch 13 further include a gusset 25, or some other suitable element for stiffening or otherwise providing rigidity to the pouch 13 in order to ensure that all of the feed is duly metered therefrom onto the tray plate 14.

Referring now in particular to FIGS. 1, 2, 6 and 7, one embodiment of the central section 12 is illustrated. In this embodiment, the central section 12 may be fabricated from plastic, cardboard or some other suitably stiff but low-cost material. The horizontal member 20 is flat and the hooks formed on the opposite ends 21 are formed as open-ended inwardly-inclined cut-outs 26. Arranged thusly, when being placed in use, the ends 21 are disposed through respective slots 19 and the cut-outs 26 engage the side walls 16 at the slots 19. The inward inclination of the cut-outs 26 aids in preventing the side walls 16 from being dislodged or otherwise inadvertently disengaged from the cut-outs 26. In this embodiment, the pouch 13 is heat-sealed directly to the horizontal member 20 between the opposite ends 21 thereof, so that the pouch 13 is carried thereby depending downwardly therefrom between the side walls 16. Finally, in this embodiment, a center plate 27 is provided being positioned above the pouch 13. This center plate 27 carries the means for supporting the feeder 10 (by, for example, the hook 22 of FIG. 1) thereon, so that the device 10 may be supported, with the pouch 13 being supported by the horizontal member 20 of the central section 12 below the center plate 27.

Referring in particular now to FIGS. 8 and 9, a second embodiment of the central section 12 is illustrated. In this embodiment, the central section 12 may be fabricated from bail wire or any other suitably stiff but low-cost material. The horizontal member 20 is round (the shape of the wire) with upwardly and outwardly inclined hooks 28 formed on the opposite ends 21 thereof. Like the embodiment described above, during construction, the ends 21 are disposed through a respective slot 19 and the hooks 28 engage the side walls 16 therein at the slots 19. The inclination of the hooks 28 aid in preventing the side walls 16 from being dislodged or otherwise inadvertently disengaged from the hooks 28.

In the embodiment of FIGS. 8 and 9, the central section 12 further includes a center member 29 in lieu of the center plate 27 described above. This center member 29 includes a pair of downwardly-extending side legs 30, each of which is joined to the horizontal member 20 by any suitable means, such as by spot welding. Each of the side legs 30 terminates below the horizontal member 20 in a pair of upwardly-inclined ears 31 that project in opposite directions. It is to be noted that, if desired, instead of a pair of ears 31, the side legs 30 can terminate in a hook. In either case, the pouch 13 is formed with a suitable pair of spaced-apart apertures 32, so that ears 31 (or hook) is received through a respective aperture 32 on the pouch 13. In this fashion, the pouch 13 is carried by the ears 31 of the center member 29, depending therefrom between the side walls 16 and above the tray plate 14. Such an arrangement eliminates the need for heat sealing or otherwise attaching the pouch 13 to the horizontal member 20. Also, as can be readily seen, it is the center member 29 that supports the pouch and not the horizontal member 20.

With reference now to FIG. 10, a third embodiment of the central section 12 is illustrated. This embodiment, like that described above with reference to FIGS. 8 and 9, may also be fabricated from low-cost bale wire and includes the same horizontal member. If desired, the horizontal member 20 may include shoulders 33 formed thereon between the upwardly-inclined hooks 28 and the remainder of the member 20. These shoulders 33 further aid in preventing dislodgement of the tray 11 therefrom.

In contrast to the device 10 described with reference to FIGS. 8 and 9, the center member 29 of the device of FIG. 10 includes only one leg 34, the upper end of which terminates in a loop 35 for being hung on a support and the lower end of which terminates in a hook 36 for supporting the pouch 13, as described above.

Figures 12, 13, 14, 15, 16:
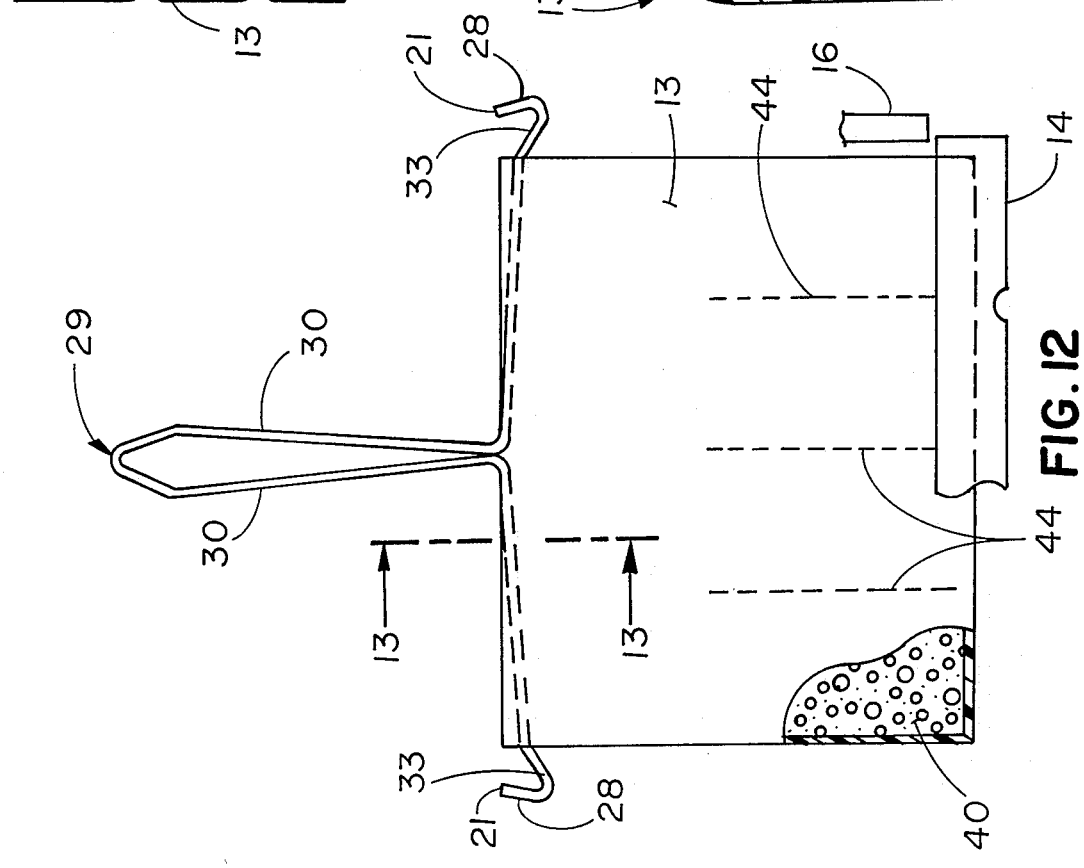
FIG. 12 is a front elevation of the embodiment of FIG. 11 showing the markings on the pouch for puncture to provide metered release of the bird feed.
FIG. 13 is a cross section taken along the lines 13—13 of FIG. 12.
FIG. 14 is a partial view of the embodiment of FIG. 11 showing puncture of the pouch to release the bird feed.
FIG. 15 is a partial view of the embodiment of FIG. 11 showing bird feed coming from the punctured opening and collecting on the tray.
FIG. 16 is a partial perspective of the embodiment of Fig. 11 showing the present invention.

As shown in FIGS. 11-16, the preferred embodiment of the present invention is illustrated. This embodiment is similar to the ones shown in FIGS. 8-10 in being fabricated from low cost bail wire and in having a horizontal member 20. The horizontal member 20 may also include shoulders 33 formed thereon and upwardly-inclined hooks 28 as in the embodiment in FIG. 10. The center member 29 includes two legs 30 which extend upwardly from approximately the center of the horizontal member 20 to form a closed loop which can be used to suspend the feeder 10 from a suitable support. The horizontal member 20 and the center member 29 may be formed from a single continuous strip of bail wire to simplify construction and to reduce costs. The upper portion of the pouch 13 may be wrapped around the horizontal bar 20 and sealed to a side of the pouch 13 using an adhesive tape, a heat sealing procedure or other means as may be desired (FIG. 13). The pouch 13 further may have lines 44 therein which may be lightly scored or perforated, and which may be punctured by a pointed instrument 46 to provide metered release of the bird feed 40 into the tray 11 as shown in FIGS. 14 and 15. In this manner, and as illustrated in FIG. 16, the feeder 10 may be suspended from a support such as a building 48 so that a bird 42 may perch on the tray 11 and eat the bird feed 40 from the tray 11 and from the pouch 13. The bird feed 40 can trickle from the pouch 13 and collect on the tray 11.

Constructed in the manner described above, to place the device 10 in use, one merely needs to: first, fold the side walls 16 of the tray 11 upwardly; second, insert the opposite ends 21 into the respective slots 19, as described above; and thirdly, hang the feeder 10 on a support. In this fashion, the bird feeder 10 may be placed in use in three easy steps.

While specific embodiments of the present invention have been shown and described to illustrate inventive principles, it is to be understood that such showing and description have been offered only by way of example and not limiting. Protection by Letters Patent of this invention in all its aspects as the same are set forth in the appended claims is sought to the broadest extent that the prior art allows.

What is claimed is:

1. A disposable bird feeder which is compact, easily assembled, and may be discarded when the feed is consumed, comprised of:
    a substantially flat tray including a pair of spaced-apart opposite side walls, the side walls being flexibly joined to the tray such that side walls may be laid out flat for storage and may be folded to form upwardly-extending side walls, each of the side walls having a lower portion integrally joined to the tray and an upper portion located above the tray;
    a central section including a horizontal member having respective opposite ends, each of said opposite ends being joined to a respective upper portion of a respective side wall of the tray, thereby supporting the tray from the central section, the central section further including means thereon for supporting the disposable bird feeder; and
    a separate pouch of bird feed supported by the central section independently of the side walls and of the tray, the pouch depending from the central section between the side walls and above the tray, wherein the pouch may be punctured to allow release of the bird feed from the pouch and onto the tray.

2. The bird feeder of claim 1, wherein the upper portion of each side wall has a respective aperture formed therein for receiving therethrough the respective opposite ends of the central section, whereby each of the opposite ends is joined to one of the respective upper portions of the side walls.

3. The bird feeder of claim 2, wherein the respective apertures formed in the upper portions of the side walls are slots.

4. The bird feeder of claim 3, wherein the opposite ends of the horizontal member of the central section have a respective hook formed thereon for engaging the slots formed in the upper portions of the side walls.

5. The bird feeder of claim 1, wherein the means for supporting the disposable bird feeder includes a hook, such that the hook may be hooked on a support for supporting the bird feeder.

6. The bird feeder of claim 1, wherein the means for supporting the disposable bird feeder includes a center plate above the pouch that carries a hook thereon, such that the hook may be hooked on a support for supporting the bird feeder, and further wherein the pouch of bird feed is supported on the horizontal member of the central section below the center plate.

7. The bird feeder of claim 1, wherein the pouch of bird seed includes at least one gusset for stiffening the pouch.

8. The bird feeder of claim 1, wherein the means to puncture the pouch of bird feed includes a tear strip for providing release of bird feed therefrom.

9. The disposable bird feeder of claim 1, wherein the substantially flat tray has a plurality of individual sections therein such that the bid feed maybe retained in each section.

10. A disposable bird feeder, in combination, comprised of:
    a tray including a pair of paced-apart upwardly-extending side walls, each of the side walls having a lower portion joined to the tray and an upper portion located above the tray;
    a central section including a horizontal member having respective opposite ends, each of said opposite ends being joined to a respective upper portion of a respective side wall, the central section further including means for supporting the disposable bird feeder;
    a pouch of bird feed carried by the central section and depending therefrom between the side walls and above the tray, the pouch including manually-manipulatable means for providing metered release of the bird feed from the pouch and onto the tray;

wherein the means for supporting the disposable bird feeder includes a center plate above the pouch that carries a hook thereon, such that the hook may be hooked on a support for supporting the bird feeder, and further wherein the pouch of bird feed is supported on the horizontal member of the central section below the center plate; and wherein the pouch of bird feed is a plastic pouch that is heat-sealed to the horizontal member, such that the pouch of bird feed is supported by the horizontal member.

11. A disposable bird feeder, in combination, comprised of:

a tray including a pair of spaced-apart upwardly-extending side walls, each of the side walls having a lower portion joined to the tray and an upper portion located above the tray;

a central section including a horizontal member having respective opposite ends, each of said opposite ends being joined to a respective upper portion of the respective side wall, the central section further including means or supporting the disposable bird feeder;

a pouch of bird feed carried by the central section and depending therefrom between the side walls and above the tray, the pouch including manually-manipulatable means for providing metered release of the bird feed from the pouch and onto the tray; and wherein the central section includes a pair of spaced apart upwardly-inclined ears, and wherein the pouch of bird feed includes a pair of spaced-apart apertures, such that each ear is received through a respective aperture on the pouch, so that the pouch of bird feed is carried by the ears of the central section depending therefrom between the side walls and above the tray.

12. A disposable bird feeder which is compact, easily assembled and may be discarded when the feed has been consumed, comprised of:

a substantially flat tray including a pair of spaced-apart opposite side walls, the side walls being flexibly joined to the tray such that the side walls may be laid out flat for storage and may be folded to form upwardly-extending side walls, each of the side walls having a lower portion integrally joined to the tray and an upper portion located above the tray;

a central section including a horizontal member having respective opposite ends and a center plate above the horizontal member, each of the opposite ends of the horizontal member being joined to a respective upper section of a respective side wall of the tray thereby supporting he tray from the central section, the center plate further including means thereon for supporting the disposable bird feeder; and a separate pouch of bird feed supported by the horizontal member between the opposite ends thereof independently of the side walls and of the tray, the pouch depending from the horizontal member between the side walls, below the center plate and above the tray, wherein the pouch may be punctured to allow release of the bird feed from the pouch and onto the tray.

13. The disposable bird feeder of claim 12, wherein each of the upper portions of the side walls has a slot formed therein, and further wherein each of the opposite ends of the horizontal member has an inclined cut-out formed therein, such that each cut-out mates with a respective slot, whereby each of the opposite ends of the horizontal member is joined to a respective upper portion of a respective side wall.

14. A disposable bird feeder which is compact, easily assembled and may be discarded when the feed has been consumed, comprised of:

a substantially flat tray including a pair of spaced-apart opposite side walls, the side walls being flexibly joined to the tray such that the side walls may be laid out flat for storage and may be folded to form upwardly-extending side walls, each of the side walls having a lower portion integrally joined to the tray and an upper portion located above the tray;

a central section including a horizontal member having respective opposite ends and a horizontal member, each of the opposite ends of the horizontal member being joined to a respective upper portion of a respective side wall of the tray, thereby supporting the tray from the central section, the center member further including means for thereon supporting the disposable bird feeder; and a separate pouch of bird feed supported by the center member between the opposite ends thereof independently of the side walls and of the tray, the pouch depending from the center member between the side walls and above the tray, wherein the pouch may be punctured to allow release of the bird feed from the pouch and onto the tray.

15. The disposable bird feeder of claim 14, wherein each of the upper portions of the side walls has an aperture formed therein and further wherein each of the opposite ends of the horizontal member has an upwardly inclined hook formed thereon, such that each hook is received in a respective aperture, whereby each of the opposite ends of the horizontal member is joined to a respective upper portion of a respective side wall.

16. The disposable bird feeder of claim 14, wherein the center member of the central section includes a pair of downwardly-extending side legs joined to the horizontal member, each of the side legs terminating below the horizontal member in an upwardly-inclined hook, and further wherein the pouch of bird feed has a pair of apertures formed therein through which respective hooks on the side legs are received, whereby the pouch of bird feed is carried by the center member.

17. A disposable bird feeder, in combination, comprised of:

a tray including a pair of spaced-apart upwardly-extending side walls, each of the side walls having a lower portion joined to the tray and an upper portion located above the tray;

a central section including a horizontal member having respective opposite ends of the horizontal member, each of the opposite ends of the horizontal member being joined to a respective upper portion of a respective side wall, the center member further including means for supporting the disposable bird feeder;

a pouch of bird feed carried by the center member between the opposite ends thereof and depending therefrom between the side walls and above the tray, the pouch including manually-manipulatable means for providing metered release of the bird feed from the pouch and onto the tray; and
wherein the center member of the central section includes a pair of downwardly-extending side legs joined to the horizontal member, each of the side legs terminating below the horizontal member in a pair of upwardly-inclined ears, and further wherein the pouch of bird feed has a pair of apertures formed therein through which respective ears on the side legs are received, whereby the pouch of bird feed is carried by the center member.

18. A disposable bird feeder which is compact, easily assembled and may be discarded when the feed has been consumed comprising a substantially flat tray, a pair of spaced-apart opposite side walls, the side walls being flexibly joined to the tray such that the side walls may be laid out flat for storage and may be folded to form vertical side walls integrally joined to the tray, each of the side walls having an upper portion, a central section including a horizontal member having respective ends joined to the respective upper portions of the vertical side walls of the tray, thereby supporting the tray from the central section, means on the central section for supporting the disposable bird feeder, a separate pouch of bird feed supported by the central section independently of the side walls and of the tray, the pouch depending from the central section between the side walls and above the tray, and wherein the pouch may be punctured for releasing the bird feed in the pouch on to the tray.

19. The disposable bird feeder of claim 16, wherein the ray is integrally molded with the respective side walls, and wherein the side walls are bent upwardly therefrom.

20. The disposable bird feeder of claim 16, wherein the upper portions of the respective side walls have respective slots formed therein, and wherein the respective ends of the horizontal member of the central section have hooks thereon received in the respective slots, thereby retaining the central section to the side walls.

21. A disposable bird feeder which is compact, easily assembled and may be discarded when the feed has been consumed comprising a substantially flat tray, a pair of spaced-apart opposite side walls, the side walls being flexibly joined to the tray such that the side walls may be laid out flat for storage and may be folded to form vertical side walls integrally molded with the tray and bent upwardly therefrom, each of the side walls including an upper portion having respective slots formed therein, a central section including a horizontal member having respective ends with hooks thereon received in the respective slots formed in the upper portion of the vertical side walls of the tray, thereby supporting the tray from the central section, and further thereby retaining the central section to the side walls; means on the central section for supporting the disposable bird feeder, a separate pouch of bird feed supported by the central section independently of the side walls and of the tray, the pouch depending from the central section between the side walls and above the tray, and wherein the pouch may be punctured for releasing the bird feed in the pouch on to the tray.

22. In a disposable bird feeder which is discarded when the feed has been consumed, the bird feeder of the type having a supporting means adapted to be attached to a substantially flat tray in which bird feed can be received, the tray having opposite side walls flexibly joined to the tray such that the side wall may be laid out flat for storage and may be folded to form upright walls, the tray being below the supporting means;
a separate pouch of bird feed supported by the supporting means independently of the side walls and of the tray, the pouch disposed between the supporting means and the tray, and wherein the pouch may be punctured to allow release of the bird feed from the pouch onto the tray.

23. The pouch of claim 22, wherein the pouch is formed of a transparent plastic material.

24. The pouch of claim 22, wherein the pouch may be carried by the supporting means by being heat sealed thereto.

25. The pouch of claim 22, wherein the pouch may have at least one aperture formed therein such that the pouch may be carried by the supporting means.

26. The pouch of claim 22, wherein the pouch has an upper portion which may be wrapped about the supporting means such that the pouch may be carried by the supporting means.

27. The pouch of claim 22, wherein the means for releasing the bird feed comprises a tear strip.

28. The pouch of claim 22, wherein the means for releasing the bird feed comprises at least one perforated line in the pouch which may be punctured by a pointed instrument.

29. A disposable bird feeder which may be discarded when the feed has been consumed comprised of:
a substantially flat tray having a plurality of stiffening ribs therein forming a plurality of individual sections within the tray, the tray being in a plane, the tray including a pair of spaced-apart opposite side walls, the side walls being flexibly joined to the tray such that the side walls may be laid out flat for storage and may be folded to form side walls upwardly-extending from the plane of the tray, each of the side walls having a lower portion integrally joined to the tray and an upper portion located above the tray, the upper portion of each side wall further having a slot therein;
a central section having respective opposite ends, each of said opposite ends having a hook means thereon, the hook means being received in the slots in respective side walls such that the tray is supported by the central section and the feeder may be easily assembled, the central section further having means thereon for supporting the disposable bird feeder from a support; and
separate pouch of bird feed supported by the central section and depending from the central section, the pouch nested between the side walls and above the tray, wherein the pouch may be punctured to allow release of the bird feed from the pouch and onto the tray.

30. The bird feeder of claim 29, wherein the slots in the side walls extend vertically from the upper portion toward the lower portion such that when the side walls are folded to form upwardly-extending side walls, the respective slots are substantially perpendicular to the plane of the flat tray.

* * * * *